US009981681B2

(12) United States Patent
Dieudonne et al.

(10) Patent No.: US 9,981,681 B2
(45) Date of Patent: May 29, 2018

(54) MODULAR CRADLE FOR A VEHICLE DRIVE TRAIN COMPRISING A TRANSVERSE BASE RECEIVING A LIGHTWEIGHT SPLIT STEERING HOUSING

(71) Applicant: JTEKT EUROPE, Irigny (FR)

(72) Inventors: Nicolas Dieudonne, Oullins (FR); Vivien Chapel, Lyons (FR); Laurent Rey, Villeurbanne (FR); Nicolas Plataret, Chaponost (FR); Raphaël Vadon, Lyons (FR); Charly Filipe, Lyons (FR); Johann Sohar, Sérézin du Rhône (FR)

(73) Assignee: JTEKT EUROPE, Irigny (FR)

( * ) Notice: Subject to any disclaimer, the term of this patent is extended or adjusted under 35 U.S.C. 154(b) by 8 days.

(21) Appl. No.: 15/028,660

(22) PCT Filed: Oct. 3, 2014

(86) PCT No.: PCT/FR2014/052514
§ 371 (c)(1),
(2) Date: Apr. 11, 2016

(87) PCT Pub. No.: WO2015/052415
PCT Pub. Date: Apr. 16, 2015

(65) Prior Publication Data
US 2016/0257335 A1    Sep. 8, 2016

(30) Foreign Application Priority Data
Oct. 10, 2013  (FR) ...................................... 13 59851

(51) Int. Cl.
*B62D 3/12*      (2006.01)
*B62D 21/11*     (2006.01)

(52) U.S. Cl.
CPC ................ *B62D 3/12* (2013.01); *B62D 21/11* (2013.01)

(58) Field of Classification Search
CPC .................................. B62D 3/12; B62D 21/11
See application file for complete search history.

(56) References Cited

U.S. PATENT DOCUMENTS

| 7,976,037 B2 * | 7/2011 | Yoshida ................. | B62D 21/11 |
| | | | 280/124.109 |
| 8,579,307 B2 * | 11/2013 | Buschjohann ..... | B22D 19/0072 |
| | | | 280/124.109 |

(Continued)

FOREIGN PATENT DOCUMENTS

| DE | 102011115387 A1 | 5/2012 |
| DE | 102011120126 A1 | 6/2013 |

(Continued)

OTHER PUBLICATIONS

International Search Report dated Jan. 21, 2015 re: Application No. PCT/FR2014/052514; pp. 1-3; citing: WO 2009/051026 A2, U.S. 2013/074621 A1, DE 10 2011 115387 A1, DE 10 2011 120126 A1 and FR 2 986 489 A.

*Primary Examiner* — Faye M Fleming
(74) *Attorney, Agent, or Firm* — Oliff PLC

(57) ABSTRACT

The present invention concerns a method for assembling a modular cradle (1) for a vehicle steering axle, said method comprising a prefabrication step (a), which involves separately producing a base (3), a first module (10) that comprises a first section (2A) of a steering housing (2) for guiding a rack, and a first bearing (11) for receiving a stabilizer bar (13), a second module (20), separate from the base (3) and from the first module (10), which comprises a second section (2B) of the steering housing (2) for guiding the rack and a second bearing (21) for receiving the stabilizer bar (13), followed by an assembly step (b), which (Continued)

involves mounting and securing the first module (10) on a left-hand receiving area (7) of the base (3), and the second module (20) on a right-hand receiving area (8) of said base (3).

25 Claims, 3 Drawing Sheets

(56) References Cited

U.S. PATENT DOCUMENTS

2013/0074621 A1    3/2013  Ueno et al.
2013/0168939 A1*   7/2013  Buschjohann ........... B62D 3/12
                                                     280/124.109

FOREIGN PATENT DOCUMENTS

| FR | 2986489 A1 | | 8/2013 | |
| JP | 2009096370 A | * | 5/2009 | ............... B62D 3/12 |
| KR | 2016090540 A | * | 8/2016 | ............... B62D 3/12 |
| WO | 2009051026 A2 | | 4/2009 | |

* cited by examiner

MODULAR CRADLE FOR A VEHICLE DRIVE TRAIN COMPRISING A TRANSVERSE BASE RECEIVING A LIGHTWEIGHT SPLIT STEERING HOUSING

TECHNICAL FIELD

The present invention concerns the general technical field of running gears of motor vehicles, and more particularly the field of cradles which are intended to be fastened to the chassis of the vehicle to support the members of such running gears, members among which mention may be made to axles, suspension members, and, in the case of steering running gears, that is to say provided with steered wheels, some steering members such as a steering housing in which a steering rack can slide.

BACKGROUND

In order to ensure a sufficient operational rigidity of the cradle and of the chassis which receives said cradle, but also in order to limit the number of manufacturing operations, it is known to use monolithic metallic cradles, which integrate in one piece, the base of the cradle and the steering housing, and which may be obtained for example by foundry.

However, due to their massive character, such cradles are relatively heavy and bulky, which may complicate their handling during the assembly operations.

Furthermore, their weight may undermine the performances of the vehicle, in particular in terms of road holding, driving comfort and fuel consumption.

Finally, the large amount of material required to realize such cradles tends to increase the manufacture cost of the latter, as well as the amount of energy required for said manufacture.

BRIEF SUMMARY

Consequently, the disclosure aims at overcoming the aforementioned drawbacks and to provide a new arrangement of axle-carrier cradle which is relatively light, while having an excellent robustness and a good operational rigidity, and the assembly of which is easy, quick and inexpensive.

Particularly, provided herein is means of a method for assembling a cradle for a steering axle of a vehicle, said method being characterized in that it includes:

a prefabrication step (a), during which are separately realized:

a base, which comprises a left stowage area designed to be fastened to a left chassis element of the vehicle, a right stowage area designed to be fastened to a right chassis element of the vehicle, a cross member which joins the left stowage area to the right stowage area, as well as a left receiving area and a right receiving area distant from each other and each intended to provide a bearing to a steering housing designed for receiving and guiding in translation a steering rack, a first module, distinct from the base, which comprises, on the one hand, a first steering housing segment intended to provide a first guide surface to the rack, as well as a first bearing which is secured to said first steering housing segment and which forms a first depression arranged to be able to accommodate and support a stabilizer bar, a second module, distinct from the base and from the first module, said second module comprising, on the one hand, a second steering housing segment intended to provide a second guide surface to the rack, and on the other hand, a second bearing, secured to said second steering housing segment, said second bearing forming a second depression arranged to be able to accommodate and support the stabilizer bar, then an assembly step (b), during which, on the one hand, the first module is attached and fastened on the left receiving area of the base, and on the other hand, the right second module is attached and fastened on the right receiving area of said base.

Advantageously, by conferring a modular character to the cradle in accordance with the invention, that is to say, by dividing said cradle into a plurality of relatively light elementary parts (first module, second module, base), which may be separately pre-manufactured and supplied, before being assembled (preferably in a reversible manner), the individual manufacturing and assembly operations of said cradle may be split up and simplified.

In particular, by avoiding the use of a single massive part at once, then the storage, transport and handling of the cradle, and of its components, on the manufacturing line and at its surroundings are simplified.

Possibly, the base may even serve directly as a support for mounting and transporting the parts, thereby replacing a pallet, and consequently allowing simplifying the supply tooling of the production line.

Of course, this modular structure has other advantages in terms of production management.

Thus, it is possible in particular to manufacture and supply the different elementary parts (modules and base) in concurrent operation time, thereby conferring some flexibility to the production.

Furthermore, it becomes possible to individually check said elementary parts prior to the assembly, thereby minimizing the risk of delayed discovery of a manufacturing defect, at an advanced stage of the production.

Similarly, if necessary, the interchangeability of the elementary parts allows considering the replacement of the defective part, thereby avoiding a costly disposing of a finished or almost finished complete cradle.

Moreover, the modular character of the cradle in accordance with the invention allows distributing and organizing more effectively the different functions of said cradle, and consequently, optimizing the shapes, sizes, masses, and selection of the constituent materials of the elementary parts attributed to each of these functions, or to each group of function.

Thus, the first module, respectively the second module, may combine, each from its respective side, within the same entity, which will be preferably entirely made in one piece in the same material, several functions, in this case a function of receiving and guiding of the steering rack, thanks to their steering housing segment, and a function of accommodating and holding, in particular radial holding, of the stabilizer bar («anti-roll» or «anti-sway» bar) which equips the running gear thanks to their stabilizer bar bearing.

Advantageously, it may be then possible to combine within the same module, but relatively compact and light module, several (in this case two) distinct functions.

Such a solution will facilitate the integration of said functions within the cradle, in particular by simplifying the subsequent (accurate and reproducible) positioning and fastening, on the first and the second modules, of the different mechanical members ensuring these functions, among which, in this case, on the one hand, the stabilizer bar ensuring the anti-roll function, which is housed in the bearing of the considered module, and on the other hand, the rack, the connecting rods and the bellows ensuring the steering control function, which are received by the steering housing segment of said module.

Furthermore, it will be possible to have different natures of the constituent materials of the elementary parts (first and second modules, base) and/or different sizing of said elementary parts depending on the mechanical requirements related to the function(s) specific thereto, so that it becomes possible to reduce the bulk of said elementary parts and/or to lighten said elementary parts, and consequently the cradle, by avoiding any unnecessary use of material.

Thus, more particularly, and as it will be detailed hereinafter, it may be preferably possible to support the main part of the structural mechanical stresses related to the holding of the chassis, and more particularly, the vertical bending stresses, the horizontal torsion stresses, or the lateral compression stresses, by the base, and more particularly by its cross member, said base may, to this end, be formed by a massive and particularly robust metallic part, whereas the first and the second modules, and more particularly their respective steering housing segments, may be realized in a compact, thin shape, and if necessary, in light materials of the composite materials type, according to a configuration strictly necessary and sufficient to ensure the functions of guiding, lubricating and protecting (against dust or water splashes, inter alia) the rack.

In other words, due to the modular character of the invention, the structural rigidity of the cradle may thus be ensured mainly or even exclusively, by the base, while the steering housing may be, in turn, lightened since there is no need for a contribution from said steering housing to said structural rigidity of the cradle, since such a contribution would be actually uselessly redundant with of the contribution from the base itself.

BRIEF DESCRIPTION OF THE DRAWINGS

Other features and advantages of the invention will appear in more detail on reading the description which follows, as well as by using the appended drawings, provided by purely illustrative and non-limiting purpose, among which.

DETAILED DESCRIPTION

The present invention concerns a method for assembling a cradle 1 for a steering axle of a vehicle, and more particularly of a motor vehicle.

The cradle 1 is intended to be fastened to the chassis 44 of the vehicle (schematically shown in dashed lines in FIG. 1), and more particularly to a left side rail 42, on the one hand, and to a right side rail 43, on the other hand.

Figure 1:
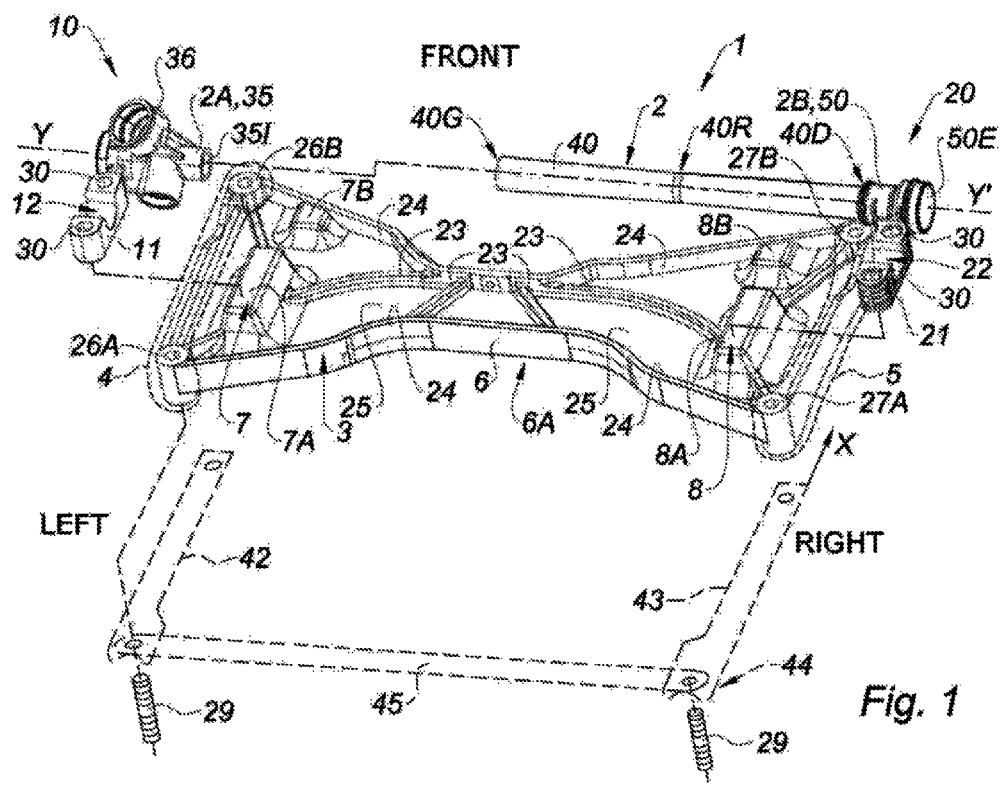
FIG. 1 illustrates, in an exploded perspective top overview, the assembly of a cradle according to the invention.

As illustrated in FIG. 1, said side rails 42, 43 of the chassis protrude from the body in white 45 of the vehicle (herein charted in dashed lines by a lower cross member in said FIG. 1), the cradle 1 forming a kind of bridge between said side rails 42, 43.

Preferably, said cradle 1 will be housed under the power train, substantially in line vertically with the latter.

By convention and for simple convenience of description, it will be noted «X» the direction of travel, substantially horizontal, corresponding to the rear-front longitudinal axis of the vehicle, «Z» the vertical direction, and «Y» the right-left transverse lateral direction, substantially horizontal, of the vehicle.

For simple convenience of description, it will be designated by «left» an element located on the side corresponding to the left half of the vehicle, and more particularly the left half of the cradle 1, with reference to the forward direction of travel, and by «right» an element located on the opposite side, with respect to the sagittal plane (the longitudinal midplane) of the vehicle and of the cradle, that is to say located on the side corresponding to the right half of said vehicle, and more particularly on the right half of said cradle 1.

The cradle 1 is intended to carry the axle(s) which respectively hold up at least one left steered wheel and at least one right steered wheel of the considered running gear, said running gear preferably constituting a front running gear.

Preferably, the steered wheels of the running gear also form the drive wheels.

The cradle 1 and/or, preferably, the side rails 42, 43 may further serve as a support to the suspension arms (or triangles) of said wheels.

The cradle 1 is also designed to provide a support to a steering housing 2, designed to guide in translation, along a steering axis (YY'), a steering actuating member (not represented), such as a steering rack.

The steering axis (YY') preferably corresponds to the axis along which the rack, and more generally the steering housing 2, extend in length (that is to say, along their largest dimension).

Furthermore, preferably, and for convenience of description, said steering axis (YY') will be advantageously considered as coincident with the transverse lateral direction $\underline{Y}$ of the vehicle.

Conventionally, the steering actuating member, which, for convenience of description, may be hereinafter assimilated to a rack, is movably mounted and guided in translation in the steering housing 2 so as to be able to displace the steering connecting rods which are fastened at each of its ends and which are each connected to a yaw oriented support, such as a stub axle, which carries the corresponding (left or right) steered wheel. In this manner, the driver can change the steering angle of said steered wheels as desired.

Said rack is advantageously driven in displacement by a steering column, controlled by a steering wheel, and the end of which is provided with a pinion which engages said rack.

The steering device may be manual, or preferably completed with an assist motor, for example a hydraulic or even electric assist motor, which engages either with the steering column, or directly with the rack, in order to apply, according to predetermined assistance laws, an assist torque which assists the driver when maneuvering the steering device.

Of course, the cradle 1 may serve as a support for other members, for example for elements of the exhaust line, such as a particulate filter.

As such, the cradle 1 may be advantageously versatile and include, as standard, different fastening interfaces that the motor vehicle manufacturer may freely choose to equip or not with the corresponding members, depending on the needs.

As example, the cradle 1 may thus be provided with a fastening interface for a particulate filter, said interface being intended either to receive a particulate filter in the case where the cradle equips a diesel vehicle, or to remain free in the case where this same cradle 1 equips a gasoline vehicle.

Figure 2:
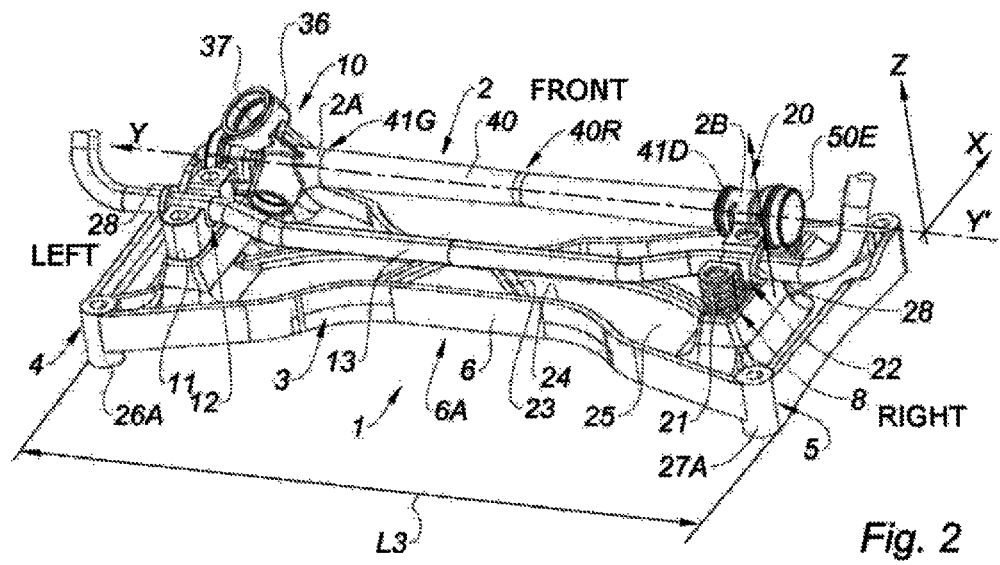
FIG. 2 illustrates, in an assembled perspective top overview, the cradle of FIG. 1 obtained by the method in accordance with the invention.

According to the invention, the method for assembling the cradle 1 firstly comprises a prefabrication step (a), during which are separately realized:

- a base 3, which comprises, as illustrated in FIGS. 1 and 2, a left stowage area 4 designed to be fastened to a left chassis element of the vehicle (such as the aforementioned left side rail 42), a right stowage area 5 designed to be fastened to a right chassis element of the vehicle (such as the right side rail 43), a cross member 6 which joins the left stowage area 4 to the right stowage area 5, as well as a left receiving area 7 and a right receiving area 8 distant from each other and each intended to provide a bearing to a steering housing 2 designed to receive and guide in translation a steering rack,
- a first module 10, distinct from the base 3, which comprises, on the one hand, a first steering housing 2 segment 2A intended to provide a first guide surface to the rack, as well as a first bearing 11 (for a stabilizer bar) which is secured to said first steering housing segment 2A and which forms a first depression 12 arranged to accommodate and support a stabilizer bar 13,
- a second module 20, distinct from the base 3 and from the first module 10, said second module 20 comprising, on the one hand, a second steering housing 2 segment 2B intended to provide a second guide surface to the rack, and on the other hand, a second bearing 21 (for a stabilizer bar), secured to said second steering housing segment, said second bearing 21 forming a second depression 22 arranged to accommodate and support the stabilizer bar.

According to the invention, the method then comprises an assembly step (b), during which, on the one hand, the first module 10 (herein, a left module) is attached and fastened on the left receiving area 7 of the base 3, and on the other hand, the second module 20 (herein, a right module) is attached and fastened on the right receiving area 8 of said base 3.

Advantageously, splitting the cradle 1, and more particularly the steering housing 2, into a plurality of relatively light elementary parts, in this case, on the one hand, a base 3 and, on the other hand, at least one first module 10 and a one second module 20, complementary to each other, and each of which offers both a portion of the steering housing 2 and a support bearing 11, 21 for the stabilizer bar 13, allows facilitating the supply and the handling of different components of the cradle 1 during the manufacture and the assembly of the latter, by avoiding the need to integrally form a massive and particularly heavy part.

This split further allows adapting the dimensions and the constituent materials of the different elementary parts 3, 10, 20 depending on their role, and more particularly depending on the stresses to which they will be subjected during the use of the vehicle, which allows limiting as accurately as possible the used amount of material, and consequently reducing the mass and the cost of the cradle 1.

Advantageously, the base 3 is intended to form the rigid carrier understructure of the cradle 1, and is preferably in the form of a lower tray on which, and more particularly on the upper face of which, are mounted, inter alia, the first and the second modules 10, 20.

The cross member 6 of said base 3, which preferably extends substantially parallel to the steering axis (YY'), from the left stowage area 4 to the right stowage area 5, advantageously forms a substantially incompressible and inextensible structure (in particular compared to the steering housing 2), of the spacer type, which effectively opposes the compressive shrinkage or the tensile spread-out of the cradle 1 along said steering axis (YY').

Furthermore, the cross member 6, and more generally the base 3, is advantageously designed to effectively resist the (vertical) bending, as well as the torsion about the steering axis (YY'), in order to limit the flexibility of the cradle 1, and more generally the flexibility of the chassis of the vehicle.

To this end, the base 3 will preferably have reinforcing ribs 23 and/or raised ridges 24, which may rest on a solid core plate 25, preferably substantially horizontal.

Preferably, in order to remain light while providing a good, stable and robust fastening foundation, to the chassis, the base 3 may substantially be in the form of «butterfly wings», the cross member 6 having, for this purpose, a central tightening 6A, while flaring (that is to say increasing its dimension along the direction of travel $\underline{X}$) at each stowage area 4, 5, as is in particular visible in FIGS. 1 and 2.

Preferably, the base 3 is formed by a monolithic plate made of a light metal alloy, such as an aluminum or magnesium alloy.

Thus, the base 3 may combine a good functional rigidity with a relatively low weight.

«Light alloy» means, conventionally, an alloy less dense (lighter) than steel, and preferably the density of which is lower than 4, or even lower than 3.

Such a base 3, which may also be relatively simply shaped, as described hereinabove, will be preferably made at a lower cost by a foundry method, of the pressure die-casting or gravity die-casting type.

Each stowage area 4, 5 of said base 3 is of course arranged so as to allow fastening to the chassis 44, preferably in a reversible manner, and for example by bolting, by means of fasteners 29 such as screws or studs.

As such, each stowage area 4, 5 includes at least one fastening member 26A, 26B, respectively 27A, 27B, and preferably several (for example two) fastening members 26A, 26B, 27A, 27B, such as barrels (herein substantially vertical), which provide at least one point for anchoring the cradle 1 to the chassis, respectively (and preferably) several points for anchoring the cradle 1 to the chassis, said anchoring points being advantageously longitudinally stepped along the direction of travel $\underline{X}$, and more particularly along each side rail 42, 43, as it is particularly visible in FIG. 1.

Advantageously, it will be possible to use the same fastener 29, such as a stud, on the one hand, for fastening the cradle 1, and more particularly the base 3, to the side rails 42, 43, and on the other hand, for connecting said side rails 42, 43 to body elements of the body in white 45, for example to a lower cross member.

As example, with reference to FIG. 1, the same stud 29, crossing the barrel 26A, may be used for fastening together, at the same time, the left stowage area 4, the left side rail 42 and the left portion of the body in white 45.

It will be the same, mutatis mutandis, on the right side, for the stud 29 engaged in the barrel 27A and thus shared by the right stowage area 5, the right side rail 43 and the right portion of the body in white 45.

Such a sharing of the fastening members 29 advantageously allows obtaining a compact arrangement, which limits the bulk and the weight of the cradle 1, while simplifying its assembly.

In addition, the two left 7 and right 8 receiving areas will be preferably laterally contained, along the steering axis (YY'), between the left 4 and right 5 stowage areas, so as to limit the bulk of the cradle 1.

As can be seen in FIG. 1, the left receiving area 7 and/or the right receiving area 8 will be (each) preferably in the form of one or more boss(es) 7A, 7B, respectively 8A, 8B, preferably substantially planar (in order to simplify the manufacture and assembly), which protrude on the core plate 25, and on which the corresponding module 10, 20 will be applied, preferably directly, as illustrated in FIG. 2.

The bearings 11, 21 of the first module 10 and the second module 20 respectively will be, in turn, advantageously arranged to provide the stabilizer bar 13 with at least two distant bearings along the steering axis (YY'), namely a left surface and a right surface, within which said stabilizer bar 13 may swivel (herein pitch swiveling) in order to accommodate its elastic torsion when opposing the roll tendency of the chassis.

For this purpose, as illustrated in the figures, the first and/or the second depression(s) 12, 22 are preferably in the form of a U-shaped recess, preferably open at the top, able to receive the stabilizer bar 13, either directly exposed, or through sockets allowing for at least one degree of pivot rotation.

Such sockets may be in the form of bearings (ball, needle or roller bearings), or, preferably in the form of bearing bushes promoting the sliding, and more particularly, in the form of elastomeric bearings ensuring both guiding of the stabilizer bar 13 and damping of impacts (filtering of bumps).

Possibly, a flange 14, 15 (schematically represented in dashed lines in FIGS. 4 and 8), which may possibly carry the aforementioned socket, will close in on the bearing 11, 21 (herein, by covering the depression 12, 22 from above) to prevent extraction of the bar 13.

Said flange 14, 15 may be for example flat or form a half-collar, bulging opposite the depression 12, 22, for example semicircular.

The axial holding of the bar 13 in translation (along the left-right lateral direction) may advantageously be achieved by providing stop collars 28, protruding radially from the bar 13.

To this end, said stop collars 28 will be preferably placed opposite to each other with respect to the left 11 and right 21 bearings, as is visible in FIG. 2, a collar blocking the displacement to the left (herein by abutting against the right bearing 21) and the other collar blocking the displacement to the right (herein by abutting against the left bearing 11).

Of course, the method will preferably comprise, subsequently to the assembly step (b), a step (c) of mounting the stabilizer bar, during which the stabilizer bar 13, possibly fitted with its sockets, will be deposited or inserted in the first bearing 11 and in the second bearing 21, and said bar 13 is clamped in said bearings 11, 21 while allowing said bar to preserve a degree of freedom in rotation about its generating line.

With respect to this, it should be noted that the presence of depressions 12, 22, preferably upwardly open, will allow for a quick and simple implementation with self-centering, of the stabilizer bar 13 from the top of the base 3.

Preferably, fastening of the first module 10, respectively of the second module 20, on the base 3, will be performed through a reversible method, such as screwing or bolting.

To this end, it is preferably possible to provide for one or more fastening holes 30 which extend through the edges (herein, the branches of the U) of each bearing 11, 21, preferably on either side of the depression 12, 22, and which allow the passage of a screw or a stud which then engages in the base 3, and more particularly in the boss 7A, 8A of the corresponding receiving area 7, 8.

Advantageously, these fastening holes 30, and more particularly the two fastening holes 30 located in the immediate vicinity of the depression 12, 22 on either side of the latter, will be advantageously also used to fasten the flanges 14, 15 attached on the bearings 11, 21 in order to prevent the extraction of the stabilizer bar 13.

Thus, for economic and lightweight reasons, it will be possible to y use shared fastening screws (or studs) to ensure both fastening of the flanges 14, 15 on the bearing 11, 21 and fastening of the bearing 11, 21 (and more generally of the corresponding module 10, 20) on the base 3.

Furthermore, it may be provided within each module 10, 20, as illustrated in FIGS. 3, 4, 6 and 8, a (third) fastening hole 30', located opposite to the bearing 11, 21 with respect to the steering housing segment 2A, 2B (or, equivalently, substantially opposite to the bearing 11, 21 with respect to the steering axis (YY')), which, in combination with the fastening hole(s) 30 of the bearing 11, 21, will further improve the positioning accuracy and the robustness of the stowage of said module 10, 20 on the base 3.

This third fastening hole 30' may be for example achieved by an extension leg 33, 34, and, possibly, engage, as illustrated in FIG. 1, within the same receiving area 7, 8 as the receiving area which accommodates the fastening holes 30 of the bearing, but on a boss 7B, 8B distinct from the boss receiving the fastening screws which pass through the fastening holes 30 of the bearing 11, 21.

Preferably, within the same module 10, 20, the bearing 11, 21 and the corresponding steering housing segment 2A, 2B will be linked by a rigid, and preferably permanent, connection which may be in the form of a connecting bridge 31, 32, herein preferably substantially oriented along a direction transverse, and more particularly perpendicular, to the steering axis (YY').

Of course, the first and second modules 10, 20, and more particularly their fastening holes 30, 30', as well as the corresponding receiving areas 7, 8, will be arranged to allow for an accurate and reproducible coaxial positioning of the first steering housing segment 2A and of the second steering housing segment 2B, in alignment one with the other along the same steering axis (YY'), and this, in order that both of said steering housing segments 2A, 2B can contribute to the (shared) guiding of the same rectilinear rack.

In a particularly preferred manner, within the first module 10, the first steering housing segment 2A and the first bearing 11 are integrally manufactured.

More generally, the first (left) module 10 will be preferably realized integrally in one monolithic and rigid piece distinct from the base 3 and from the second module 20.

Such a monolithic, particularly robust, piece may be advantageously produced at a lower cost and may be mass-produced, for example by stamping or, preferably, by molding.

Figure 3:
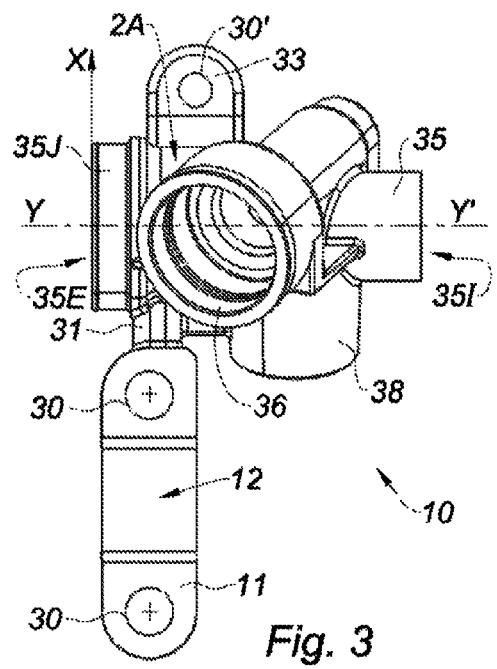
FIGS. 3, 4 and 5 illustrate, respectively in a top projection view, in a side projection view (seen from the left) and in a perspective view, an embodiment of the first module in accordance with the invention, used on the assembly of FIGS. 1 and 2.
Figure 4:
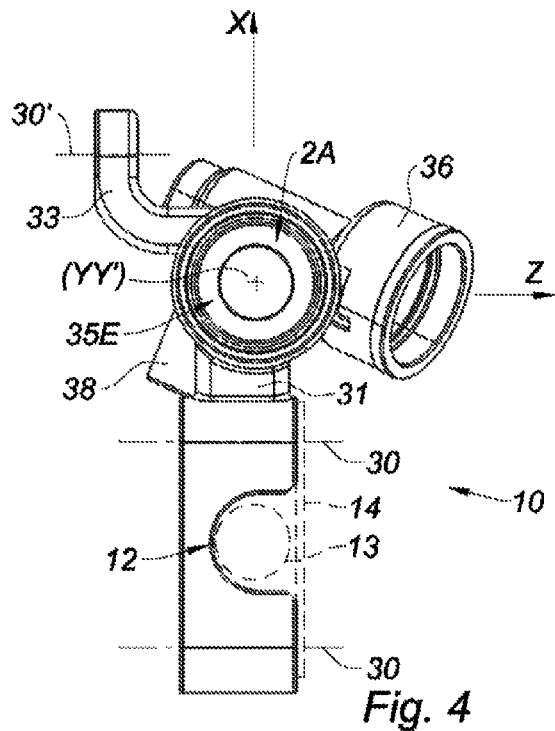
Figure 5:
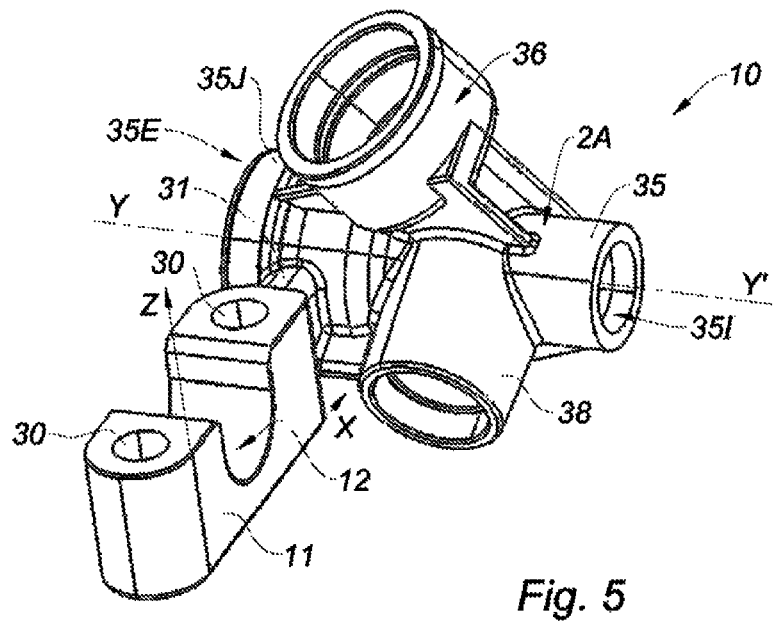

Furthermore, according to a preferred arrangement, and as is particularly visible in FIGS. 3 to 5, the first steering housing segment 2A of the first module 10 comprises a first guide sleeve 35, designed to be crossed by the steering rack in order to guide in translation said steering rack along the steering axis (YY').

The guide sleeve 35 is preferably in the form of a tube centered on the steering axis (YY'), and preferably has a substantially circular cross-section.

The inside of said guide sleeve 35 will preferably accommodate a rack guide bearing (not represented), such as a plain bearing or a linear ball bearing, bearing on said sleeve 35, and designed to receive the rack and guide the latter in translation.

Preferably, the first steering housing segment 2A of the first module 10 also comprises an access sleeve 36, intersecting the steering axis (YY'), and arranged to enable a steering column provided with a drive pinion to engage said rack.

Preferably, the first guide sleeve 35 and the access sleeve 36 are integrally formed.

The access sleeve 36, preferably cylindrical with a circular base, advantageously approaches the first guide sleeve 35 transverse to the latter, and communicates with the inside of said first guide sleeve 35, so as to allow the pinion to access to the rack.

Furthermore, the first steering housing segment 2A preferably includes also a yoke sleeve 38 which intersects the steering axis (YY'), and is preferably substantially perpendicular to the access sleeve 36, and which is designed accommodate a yoke (not represented) intended to compensate the gear backlash of the rack against the pinion.

To this end, said yoke may include a piston, which is slidingly mounted in the jacket formed by the yoke sleeve 38, and which is elastically biased against the back of the rack and, indirectly, against the pinion, by a return member of the spring kind.

The yoke sleeve 38 is preferably integrally formed with the first guide sleeve 35 and/or with the access sleeve 36.

As illustrated in FIGS. 3 and 5, the guide sleeve 35 may advantageously extend on either side of the access sleeve 36 and/or of the yoke sleeve 38 (by substantially forming a T with each of the latter), so as to have, on the one hand, an inner mouthpiece 35I which points toward the second steering housing segment 2B (and which is preferably intended to be connected to said second steering housing segment 2B), and on the other hand, on the opposite side, outward from the cradle 1 (herein to the left), an outer mouthpiece 35E oriented toward the connecting rod and the steered wheel.

Preferably, the circumference 35J of the outer mouthpiece 35E will form a rim, possibly provided with an annular groove, said rim allowing accommodating and fastening a flexible and extensible bellows protecting the end of the rack and the connection (for example of ball joint type) of said rack with the connecting rod (herein the left connecting rod).

Preferably, and also regardless of the number and the arrangement of its different parts (the bearing 11, the first steering housing segment 2A, the sleeves 35, 36, 38), the first module 10 is made of a light metal alloy (according to the aforementioned meaning), such as an aluminum alloy or a magnesium alloy.

Thus, the first module 10 can combine with some lightness (nevertheless) a sufficient rigidity enabling it to ensure an accurate and stable guiding of the rack, through the guide sleeve 35, as well as an effective meshing with the steering column.

Alternatively, the first module 10 could nonetheless be made of a sufficiently robust composite material, for example a composite material with a polymer matrix reinforced with reinforcing fibers.

In any case, regardless of its constituent material, the first module 10 may be made entirely in one piece, by integrating the first bearing 11, and the sleeve(s) 35, 36, 38 of the first steering housing segment 2A.

In particular, such an arrangement will guarantee the robustness of the module 10 and the accuracy of the positioning of its components, and consequently, the ease of assembly and integration of said module 10 as well as the quality of the rack guiding.

Of course, the second module 20 may present, mutatis mutandis, all or part of the described features with reference to the first module 10.

In particular, the second steering housing segment 2B of the second module 20 (herein placed on the right side) preferably comprises a second guide sleeve 50, designed so as to be crossed by the steering rack in order to guide in translation said steering rack along the steering axis (YY').

In other words, either one or both of the first steering housing segment 2A of the first module 10 and/or the second steering housing segment 2B of the second module 20 may comprise a guide sleeve 35, 50.

The second guide sleeve 50 is advantageously intended to receive a second rack guide bearing (not represented), such as a plain bearing or a linear ball bearing, ensuring the guiding in translation of the rack.

Of course, in a similar manner to that described with reference to the first guide sleeve 35 of the first module 10, the second guide sleeve 50 of the second module 20 preferably has an inner mouthpiece 50I (herein at its left end), and an outer mouthpiece 50E (herein at its right end) through which the right end of the rack and the corresponding connecting rod may emerge.

Herein again, the circumference 50J of the outer mouthpiece 50E of said second guide sleeve 50 may form a rim, possibly provided with a groove, and designed to receive and maintain a protection bellows, the end of which can engage the connecting rod (herein the right connecting rod).

Preferably, within the second module 20, the second steering housing segment 2B (and more particularly the second guide sleeve 50) and the second bearing 21 are integrally manufactured.

Herein again, such an arrangement will guarantee the robustness of the module 20 and the accuracy of the positioning of its components, and consequently, the ease of assembly and integration of said module 20 as well as the quality of the rack guiding.

Ultimately, it is possible to freely choose the arrangement of the modules 10, 20 so that, within their respective module 10, 20, the first steering housing segment 2A and the first bearing 11 are integrally manufactured, and/or the second steering housing segment 2B and the second bearing 21 are integrally manufactured.

Preferably, the assembly step (b) comprises a steering housing reconstitution sub-step (b1) during which the first steering housing segment 2A of the first module 10 is connected to the second steering housing segment 2B of the second module 20 by means of a protection tube 40, which is distinct from the base 3 and inside of which the rack is intended to slide, so as to reconstitute a continuous steering housing 2 from the first module 10 to the second module 20.

More particularly, said protection tube will be connected, by its first end (herein the left end) 40G, to the first steering housing segment 2A, and more particularly to the first guide sleeve 35, at a first junction denoted 41G, and by its second opposite end (herein the right end) 40D, to the second steering housing segment 2B, and more particularly to the second guide sleeve 50, at a second junction denoted 41D, so as to form a conduit which puts the guide sleeves 35, 50 in communication and through which the rack may slide.

Advantageously, by reconstituting a complete steering housing 2 in this way, forming a continuous shell which extends, as an uninterrupted bridge, over the width of the cradle 1, from the first module 10 to the second module 20, herein above the cross member 6, it will be possible to effectively guide and protect the rack, and more generally the steering mechanism, by maintaining the rack (and the pinion) inside a shell sealed against dust, water splashes, salt spray, as well as against the lubricant which facilitates the translational motion of said rack within said steering housing 2.

Furthermore, such a junction between the modules 10, 20 facilitates and improves the accuracy of the alignment of the steering housing segments 2A, 2B along the steering axis (YY'), and may, possibly, increase the overall rigidity of the steering housing 2, in particular regarding the vertical bending.

The protection tube 40, and more particularly the apparent segment of said protection tube 40 which extends from the inner mouthpiece 35I of the first guide sleeve 35 to the inner mouthpiece 50I of the second guide sleeve 50, preferably covers a length which corresponds to more than half of the overall width L3 (measured along the right-left steering axis (YY')) of the base 3.

Thus, by enabling the modules 10, 20, and more particularly the guide sleeves 35, 50 carrying the rack, to keep away at a significant distance from each other, without losing the protection effect of the steering housing 2, the protection tube 40 maximizes the guide surface of the rack, thereby improving the stability and the accuracy of said guiding, while preserving the lightness of the steering housing 2.

Preferably, during the steering housing reconstitution sub-step (b1), the combination and the junction of the protection tube 40 with the first guide sleeve 35 belonging to the first module 10, and/or respectively the combination and the junction of said protection tube 40 with the second guide sleeve 50 belonging to the second module 20, are ensured by interlocking said protection tube 40 and said guide sleeve 35, 50 into each other, in the extension one of the other along the steering axis (YY').

As such, it may be provided, on the protection tube 40 and/or on the considered guide sleeve(s) 35, 50 an excess length allowing the mutual overlap of these elements.

At each considered junction, said overlap length, measured along the steering axis (YY'), may be substantially comprised between 20 mm and 40 mm, and may more particularly be about 30 mm.

One or more wiper seal(s), for example O-rings housed in annular grooves, may be interposed radially between the protection tube 40 and the considered guide sleeve 35, 50 to ensure the sealing of the interlocking assembly.

Advantageously, an interlocking assembly is simple and quick to implement, and may further allow, as will be detailed hereinafter, a residual mobility between the protection tube 40 and the module 10, 20, which facilitates the adjustment of the spatial configuration of the steering housing 2.

Indeed, according to a preferred feature which may constitute a fully-fledged invention, during the steering housing reconstitution sub-step (b1), at least one of the junctions 41G, 41D between the tube protection 40 and one of the steering housing segments 2A, 2B of one of the modules 10, 20, preferably the junction (herein 41G) between the protection tube 40 and the first steering housing segment 2A of the first module 10, is performed while keeping at least one degree of freedom between said protection tube 40 and the module 10, 20, preferably one degree of freedom in translation along the steering axis (YY') and/or one degree of freedom in rotation about said steering axis (YY'), so as to allow for a relative mobility of the protection tube 40 relative to the considered module 10, 20 without breaking the continuity of steering housing 2.

Preferably, during the steering housing reconstitution sub-step (b1), the protection tube 40 may be in particular interlocked with the guide sleeve 35, 50 of the considered module 10, 20 along the steering axis (YY'), so as to form a sliding junction 41G, 41D (allowing sliding in translation) or a sliding-pivot junction (allowing the translation and the rotation) along said steering axis (YY').

In other words, it is possible to carry out a free interlocking, so as to preserve a degree of freedom of the protection tube 40 relative to the considered guide sleeve 35, 50, sliding (and/or in rotation) along the steering axis (YY'), without jeopardizing the continuity or the sealing of the steering housing 2, which advantageously allows said steering housing 2 to accommodate deformations, and in particular axial expansions along said steering axis (YY').

In particular, such an arrangement will, of course, facilitate the assembly of the cradle 1, by providing a possibility to adjust the center-to-center distance (by sliding in translation) and/or the tilt orientation (pitch rotation) when positioning and fastening the modules 10, 20 on their respective receiving area 7, 8.

Preferably, the degree(s) of freedom between the protection tube 40 and the considered module(s) 10, 20 will remain permanently at the considered junction 41G, even after fastening the modules 10, 20 on the base 3, so as to preserve the adaptability of the steering housing 2 to the deformations and relative motions between its components.

More particularly, such a sliding interlocking will allow the steering housing 2 to accommodate without any stresses (in particular traction/compression stresses along the steering axis (YY') and/or torsion stress about this same axis), the dimensional changes related to possible thermal expansions affecting the modules 10, 20, the protection tube 40 and/or the base 3 to which said modules 10, 20 are attached.

This will be particularly appreciated in the case where different materials are used to manufacture the base 3 and the steering housing 2, or in the case where different materials are used to manufacture each of the first and the second modules 10, 20, so that differential thermal expansions are likely to occur between these elements.

Of course, other alternative possibilities for coupling the left 2A and the right 2B steering housing segments may nevertheless be considered, for example by gluing, or even by circumferential clamping, by abutting and bolting therebetween collars which would be formed at the respective ends of the guide sleeve 35, 50, on the one hand, and at the protection tube 40, on the other hand.

Preferably, and regardless of the form of the junctions between the modules 10, 20 and the protection tube 40, the steering housing 2 reconstitution sub-step (b1) takes place before a setting up sub-step (b2) during which the first module 10 and the second module 20, linked to each other beforehand by the protection tube 40, are attached and fastened on their respective left 7 and right 8 receiving areas.

In other words, the steering housing 2 will be preferably preconstituted by combination (preferably by sliding interlocking) of the first module 10 and the second module 20, before being brought and fastened as a sub-assembly on the base 3.

In general, the supply of the steering housing 2 on the line and its carrying maneuver on the base 3 will be thus facilitated.

Advantageously, pre-assembling the steering housing 2, associated with using one or two junction(s) 41G, 41D of the sliding interlocking type as described hereinabove, greatly facilitates the implementation and position adjustment of the components of said steering housing 2 on the base 3, thereby shortening the duration of the setting up sub-step (b2).

Preferably, the fastening of the first and the second modules 10, 20 on the receiving areas 7, 8 of the base 3 will be carried out by screwing or bolting through the fastening holes 30, 30'.

Preferably, only the effective fastening in position of the modules 10, 20 of the steering housing 2 on the base 3 will allow maintaining said steering housing 2 in its final functional form, since the modules 10, 20 keep, indeed, their relative displacement freedom, and in particular their mutual axial separation freedom, until said fastening on the base 3 takes place (said fastening on the base setting in particular the distance which axially separates said modules).

Preferably, and actually regardless of the retained embodiment, the protection tube 40 is initially, that is to say prior to the steering housing 2 reconstitution sub-step (b1), distinct from at least one of the first and the second modules 10, 20.

Furthermore, the junction between the first module 10 and the second module 20, and more particularly the junction between the protection tube 40 and at least one of the guide sleeves 35, 50 (or even both junctions of the tube 40 with respectively each one of the guide sleeves 35, 50), will be preferably reversible.

Thus, due to the modular character of the steering housing 2, a defective module 10, 20, or even only the protection tube 40, may be easily replaced, if necessary, without it being necessary to dispose the entire said steering housing 2, and a fortiori the entire 1 cradle.

It will be also noted that the arrangement provided by the invention allows intervening on the bar 13 or on the steering housing 2, and in particular setting these in place or removing them from the base 3, whether the cradle is fastened on the side rails 42, 43, or not, and in particular before bringing and attaching the cradle on the side rails 42, 43.

It will be also noted that it is possible to easily adjust the configuration of the steering housing 2, and in particular to readjust the position or the orientation of the modules 10, 20, on the base 3, or even to proceed to the replacement of one of these elementary components, without interfering with the fastening of the stowage areas 4, 5 on the side rails 42, 43.

The modular arrangement specific to the invention, and more particularly the independent character (structurally and functionally) of the base 3, the first module 10, the second module 20, and the side rails 42, 43, allows for a great freedom as for the realization of these components and for the order of implementation of the steps of the assembly process, and consequently, for the organization of the supply (delivery) and manufacture cycle.

Furthermore, dissociating the manufacture of the protection tube 40 and at least one of the modules 10, 20, or even dissociating the manufacture of said tube 40 and each of the two modules 10, 20, advantageously allows making the protection tube 40 in a material different from that of the considered module(s) 10, 20, and more particularly in a material mechanically less resistant (and therefore a priori cheaper and lighter) than the constituent material of the guide sleeves 35, 50.

More generally, it will be noted, indeed, that the arrangement specific to the invention allows relieving the protection tube 40 from any significant mechanical stress, said tube 40 having to assume only but a simple role as a protection screen (and in particular watertight screen) for sealing the rack from its environment.

Indeed, the guiding efforts of the rack, and in particular the radial efforts, transverse to the steering axis (YY'), are supported by the guide sleeves 35, 50.

The structural efforts applied on the chassis 44, and in particular the impacts and the deformations due to the driving, such as transverse shrinkage stresses, torsion stresses, or vertical bending stresses, are supported by the base 3 and more particularly by the cross member 6.

Thanks to the invention, it is therefore unnecessary to provide redundant structures to ensure the rigidity of the cradle 1, or to over-size the steering housing 2 and in particular the protection tube 40.

Consequently, when the protection tube 40 is initially formed separately from at least one of the modules 10, 20, for example separately from the first module 10, the constituent material of said protection tube 40 may preferably be different from the constituent material of said module 10, 20, and preferably less dense than said constituent material of said module 10, 20.

Anyway, the protection tube 40 may preferably be realized in a composite material comprising a polymer material matrix reinforced with fibers.

More particularly, the matrix may be made of an aliphatic polyamide (PA6 or PA66 for example), an aromatic polyamide (PA6T6I for example), Polybuthyleneterephtalate (PBT), polyphenylenesulfphone (PPS), polyester (PE) or epoxy.

Glass, aramid or carbon reinforcing fibers may be used.

Said fibers may be either randomly distributed in the polymer matrix in the form of short fibers, or on the contrary, ordered in the form of continuous fibers, in order to reinforce the module 20 in highly stressed areas.

Glass, aramid or carbon fibers may be used either alone or in mixed combination (glass and carbon, or carbon and aramid, or a mixture of these three).

If necessary, the steering housing 2 may result from the assembly of a protection tube 40 made of a composite material with at least one module 10, or even with both modules 10, 20 made of a light metal alloy as described hereinabove.

According to a first embodiment, the protection tube 40 may be manufactured separately from each of the first and the second modules 10, 20.

According to an assembly possibility, the attachment of the protection tube 40 with the two modules 10, 20 may then be achieved by two junctions 41G, 41D of the sliding interlocking type, advantageously reversible, as described hereinabove.

Thus, a freedom of movement will be preserved between each module 10, 20 and the corresponding end of said tube 40.

Nonetheless, according to another preferred assembly possibility, the protection tube 40 may be manufactured separately from each one of the first and the second modules 10, 20, and then, attached and fastened on one of said modules, for example (and for convenience of description) on the second module 20.

To this end, the protection tube 40 may preferably be fastened, and in particular interlocked, glued and/or welded, in particular by friction welding, tightly to the lubricant and preferably watertight, in or against the second steering housing segment 2B, and more particularly in or against the second guide sleeve 50, in the axial extension of said second segment 2B (respectively in the axial extension of said second guide sleeve).

More generally, it will be noted that, according to a preferred configuration, during the steering housing reconstitution sub-step (b1), the protection tube 40 is secured beforehand by one of its ends 40D to one of the modules 10, 20, preferably the second module 20, according to a fixed junction (herein the second junction 41D) which holds said protection tube 40 in a fixed position with respect to said module 20, prior to being engaged afterwards, by its opposite end 40G, on the other module 10, preferably the first module 10, according to a junction (herein the first junction 41G) which allows a relative mobility.

Advantageously, by securing the protection tube 40 and the module 20 within the same single sub-assembly which can be easily handled, the maneuvers of engagement and adjustment with the other module 10 will be facilitated.

Possibly, the two modules 10, 20 may be made of the same constituent material, for example a light metal alloy, and form a bi-material steering housing with the protection tube 40 made of a composite material.

Alternatively, each one of the modules 10, 20 may be made of a material distinct from that of the other module, and further different from the constituent material of the protection tube 40, so as to form a tri-material steering housing 2.

Furthermore, it is not excluded that the first module 10 and/or the second module 20 are themselves made of composite material(s) with a polymer matrix among those mentioned hereinabove.

If any, the constituent composite material of the considered module(s) 10, 20 may be selected to be mechanically more resistant than the constituent composite material of the protection tube 40.

Figure 6:
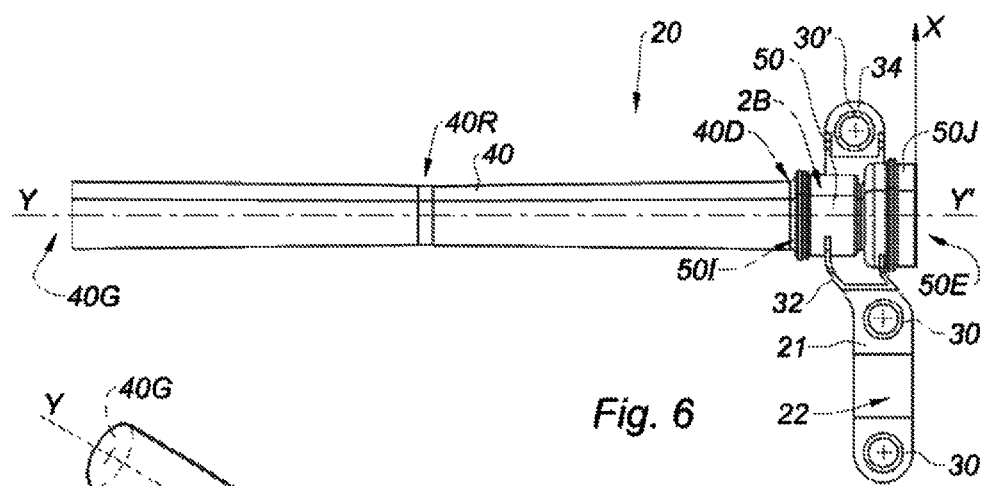
FIGS. 6, 7 and 8 illustrate, respectively in a top projection view, in a perspective projection view and in a side projection view (seen from the right), an embodiment of the second module in accordance with the invention, complementary to the first module and used on the assembly of FIGS. 1 and 2.
Figure 7:
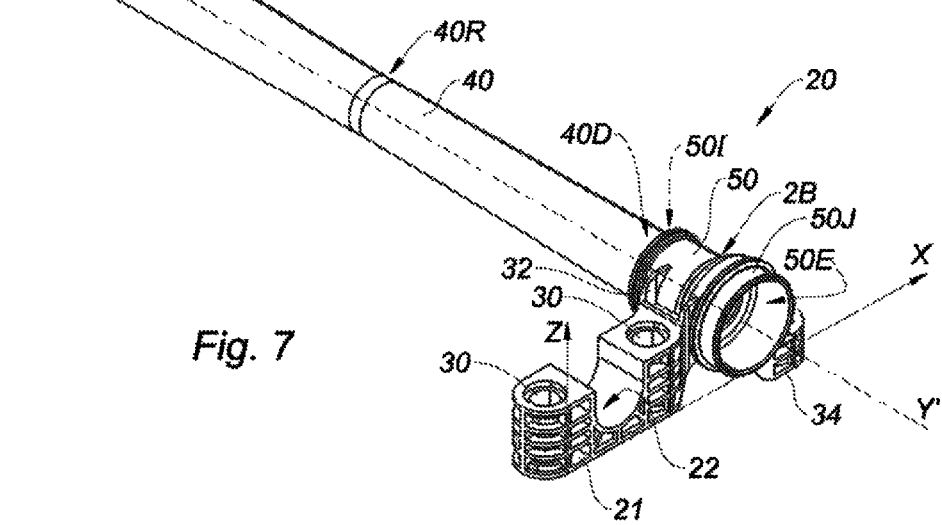
Figure 8:
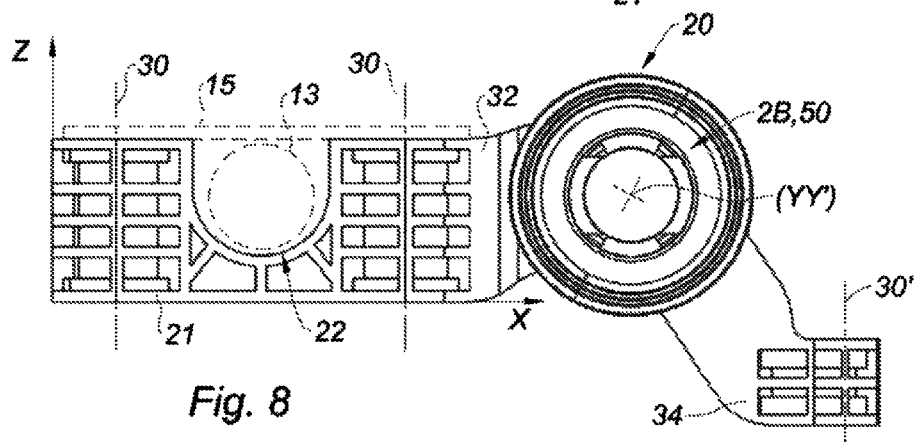

According to a second embodiment, illustrated in particular in FIGS. 6 to 8, the protection tube 40 may be integrated in one piece with the second module 20, by being formed integrally with the second guide sleeve 50 (and if possibly, with the second stabilizer bar 13 bearing 21), in the extension of said guide sleeve 50 along the steering axis (YY').

In other words, during the prefabrication step (a), the protection tube 40 is preferably manufactured integrally with one of the modules 10, 20, preferably with the second module 20.

According to this second embodiment, as can be seen in FIG. 2, the first (left) module 10 and the second (right) module 20 will then be designed to be directly complementary to each other, that is to say so that their respective steering housing segments 2A, 2B can be combined so as to directly touch each other and reconstitute a steering housing 2.

According to such asymmetrical distribution, related to the integration of the protection tube 40 to the second module 20, the junction of the protection tube 40 with the first module 10 is performed in the left half of the cradle 1, as illustrated in FIG. 2.

According to this second embodiment, the first module 10 may thus be more compact, and more particularly strictly shorter, along the steering axis (YY'), than the second module 20, while nevertheless allowing for a sealed junction of the two modules 10, 20.

Therefore, it is advantageously possible to generally lighten the steering housing 2, by realizing not only the protection tube 40, but more generally the entire second module 20, in a lighter (less dense) material than the material which constitutes the first guide sleeve 35, and more generally the first module 10.

Furthermore, herein again, it will then be possible to handle the protection tube 40 together with the module 20 associated thereto, as a unique sub-assembly, which will facilitate the maneuvers of engagement and adjustment with the other module 10.

Preferably, the second module 20 may in particular be made of a composite material comprising a polymer material matrix reinforced with fibers, and more particularly, of a composite material as described hereinabove with reference to the protection tube 40.

The second module 20 will then preferably be made by injection molding, at a lower cost.

Herein again, it is in particular possible to consider a mixed, bi-material steering housing structure 2, by coupling a second module 20 made of a polymer-based composite material with a first module 10 made of a light metal alloy.

In any case, the constituent material of the second module 20, and/or the constituent material of the protection tube 40, may be distinct and less dense than the constituent material of the base 3, thus contributing to lighten the cradle 1 without jeopardizing the strength or the rigidity of said cradle 1.

According to a third embodiment (not represented), it could be considered that the first module 10 and the second module 20 have steering housing segments 2A, 2B substantially symmetrical with respect to the sagittal plane of the vehicle (which herein corresponds to the plane parallel to the direction of travel $\underline{X}$ and passing through the middle of the cross member 6).

According to such an embodiment, the guide sleeve 35 of the first module 10 and the guide sleeve 50 of the second module 20 could each extend (each one toward the other), along the steering axis (YY'), by a respective protection tube 40 portion.

More particularly, each of said modules 10, 20, and more specifically each of said protection tube 40 portions, may substantially cover half the distance separating the respective fasteners of said modules, so that said modules 10, 20 would perform a direct junction, for example by interlocking, substantially at the middle of the cradle 1, that is to say substantially in the sagittal plane which bisects said cradle 1 into a left half and a right half.

Furthermore, it would be noted that, ultimately, the steering housing 2 may be advantageously subdivided axially into only two elements (pursuant to the aforementioned second and third embodiments), or even, into three elements (pursuant to the aforementioned first embodiment), distinct but contiguous.

More particularly, three parts (the first module 10, the second module 20 and the protection tube 40), or only two parts (the first module 10, and the second module 20 which integrates the protection tube 40) will be sufficient therefore to reconstitute, together and complementarily over the width of the cradle 1, the entire tubular portion of the steering housing 2 which ensures the guiding and the protection of the rack, without requiring the addition of any intermediate steering housing segment (in particular between the first and the second steering housing segments 2A, 2B).

The manufacture and the assembly of the steering housing 2, and consequently of the cradle 1, will be then simplified.

Moreover, regardless of the retained embodiment, the protection tube 40 is preferably generated in the form of a cylinder, preferably with a circular cross-section, sweeping along the rectilinear steering axis (YY'), on which said cylinder is preferably centered.

Preferably, the thickness of the wall of said protection tube 40 will be substantially constant.

Said thickness, measured in the radial direction perpendicular to the steering axis (YY'), may for example be comprised between 2.5 mm and 4 mm.

According to one variant, the protection tube 40 may have a substantially constant diameter throughout its length, from the first module 10 to the second module 20, and more particularly, from the first guide sleeve 35 to the second guide sleeve 50.

According to such a variant, particularly adapted for realizing a tube 40 initially separate from the first and the second modules 10, 20, and then attached to the latter, said tube 40 may for example be obtained by cutting off, to the desired length, a metal or composite profile obtained by extrusion or pultrusion.

According to another variant, which may constitute a fully-fledged invention, the protection tube 40 may instead have a waist 40R, so as to adopt a substantially biconical shape, as illustrated in FIGS. 2, 6 and 7.

Preferably, said waist 40R will be located substantially at the middle of said tube 40, that is to say at the mid-length which substantially coincides with the sagittal plane of the cradle 1.

Advantageously, such a waist 40R allows realizing the protection tube 40 easily by molding, if necessary, integrally with the second guide sleeve 50, by using two (left and right) core pins which form truncated-cone shaped cores and which are joined (opposite to each other by their small base) in a joining plane which is located at the waist 40R and which is substantially perpendicular to the steering axis (YY').

Advantageously, such a dual-cone embodiment, and more particularly with a central waist 40R, has two draft angles, (one draft angle to the left and the other draft angle to the right), thereby allowing limiting the diameter of the tube 40 at its ends 40G, 40D, in comparison with a mono-truncated cone shaped tube with would have one single draft angle, while maintaining a suitable draft angle, and therefore guaranteeing the ease of stripping, despite the significant length of said tube 40.

Thus, it is possible to reduce the size of the mold, the overall bulk of the protection tube 40, the weight of said tube 40, as well as the amount of material necessary for the manufacture thereof.

Furthermore, and regardless of the shape of the protection tube (rectilinear, convex, concave, bi-conical, etc.), said protection tube 40 will preferably have a diameter (and a cross-sectional shape) substantially identical at both of its ends 40G, 40D.

In a particularly preferred manner, the side rails 42, 43 are, in turn, made of steel.

Indeed, such a material allows obtaining side rails which are particularly robust and easy to shape in particular by stamping.

Furthermore, the ductility of steel allows the side rails 42, 43 to ensure a passive protection function of the cockpit of the vehicle in case of a collision, and more particularly in case of a frontal impact, by conferring to said side rails 42, 43 a capacity of being plastically deformed, in a programmed manner, while absorbing and dissipating a portion of the energy of said impact.

Herein again, the modularity of the cradle 1 will allow dedicating this passive protection function to the side rails 42, 43, in particular by realizing said side rails 42, 43 in a suitable material, such as steel, distinct from, and in this case, more dense than the constituent material of the base 3 (and of the constituent material(s) of the modules 20, 30).

Preferably, the front end of the left side rail 42 may further be linked to the front end of the right side rail 43 by a bow called «crash frame» (not shown), distinct from the base 3, and which forms a forward extension of the chassis 44, below the engine.

Such an arrangement advantageously allows conferring to the chassis 44 a closed contour (in combination with the side rails 42, 43 and the cross member of the body in white 45), which is robust but nevertheless capable of being deformed, if necessary to dissipate the energy of an impact.

Of course, the invention also relates, as such, to a steering housing 2 intended to accommodate and guide in translation, along a steering axis (YY'), a steering actuating member, such as a rack, said steering housing 2 being longitudinally split, on the one hand, into a first module 10 which comprises in one piece, in a first material:

a first steering housing 2 segment 2A which is designed to form a first guide surface of the steering actuating member, and which covers, to this end, a first length portion along the steering axis (YY'), as well as a first bearing 11 forming a first depression 12 arranged as to enable accommodating and supporting a stabilizer bar 13, and, on the other hand, into a second module 20 which comprises in one piece, in a second material different from the first material:

a second steering housing 2 segment 2B which is designed to form a second guide surface of the steering actuating member, axially distinct from the first guide surface provided by the first steering housing segment 2A, said second steering housing segment preferably extending by a protection tube 40 so as to cover a second length portion along the steering axis (YY') which completes the length portion covered by the first steering housing segment 2A, as well as a second bearing 21 forming a second depression 22 arranged to enable accommodating and supporting the stabilizer bar 13 at a distance from the first bearing 11.

Preferably, said first and second steering housing segments 2A, 2B are juxtaposed, along the steering axis (YY'), and more preferably interlocked, so as to form the complete steering housing 2, along its entire length, and to ensure an accurate guiding, an effective lubrication, and a reliable protection of the rack which slides within said steering housing segments.

Of course, the invention concerns, as such, a first module 10 or a second module 20, and more particularly, a pair of left/right modules 10, 20 according to either one of the described variants, each of said modules comprising, in one piece, on the one hand, at least one first branch forming a steering housing segment 2A, 2B capable of guiding the rack (in the form of a first guide sleeve, and respectively a second guide sleeve 50, possibly extending by an integrated protection tube 40), and on the other hand, at least one second branch, preferably forming an extension secant, and even substantially perpendicular, to the first branch, and which carries a bearing 11, 21 intended to accommodate a stabilizer bar 13, and finally, fastening means, for example fastening holes 30, 30', allowing for the individual attachment and fastening of the considered module 10, 20 on a base 3 of the cradle 1, preferably in a reversible manner to preserve removability of said considered module 10, 20.

Finally, the invention concerns, as such, a cradle 1 obtained according to the method in accordance with the invention, as well as a vehicle, and more particularly a motor vehicle intended for the transport of people and/or goods, of the kind with drive and steered wheels, which is equipped with such a cradle 1.

Of course, the invention is by no way limited to the variants described hereinabove, those skilled in the art being able in particular to isolate or to combine together either ones of the aforementioned features, or to substitute them with equivalents thereto.

In particular, it would be perfectly conceivable to adapt mutatis mutandis the method and the described cradle by permuting the references at the left and right sides.

The invention claimed is:

1. A method for assembling a cradle for a steering axle of a vehicle, said method comprising:
   a prefabrication step, comprising separately fabricating:
      a base, comprising a left stowage area configured to be fastened to a left chassis element of the vehicle, a right stowage area configured to be fastened to a right chassis element of the vehicle, a cross member joining the left stowage area to the right stowage area, and a left receiving area and a right receiving area distant from each other and each arranged to provide a bearing to a steering housing configured for receiving and guiding in translation a steering rack,
      a first module, distinct from the base, comprising a first steering housing segment providing a first guide surface to the rack, and a first bearing which is secured to said first steering housing segment and which forms a first depression arranged to accommodate and support a stabilizer bar,
      a second module, distinct from the base and from the first module, said second module comprising a second steering housing segment providing a second guide surface to the rack, and a second bearing secured to said second steering housing segment, said second bearing forming a second depression arranged to accommodate and support the stabilizer bar,
   and an assembly step, comprising:
      attaching and fastening the first module on the left receiving area of the base and
      attaching and fastening the second module on the right receiving area of said base.

2. The method according to claim 1, wherein within the first module, the first steering housing segment and the first bearing are integrally manufactured, and/or within the second module, the second steering housing segment and the second bearing are integrally manufactured.

3. The method according to claim 1, wherein the first steering housing segment of the first module comprises a first guide sleeve configured to be crossed by the steering rack in order to guide in translation said steering rack along a steering axis, and/or the second steering housing segment of the second module comprises a second guide sleeve configured to be crossed by the steering rack in order to guide in translation said steering rack along said steering axis.

4. The method according to claim 1, wherein the first steering housing segment of the first module comprises a first guide sleeve configured to be crossed by the steering rack in order to guide in translation said steering rack along a steering axis, and an access sleeve, intersecting the steering axis and arranged to enable a steering column provided with a drive pinion to engage with said rack.

5. The method according to claim 1, wherein the assembly step further comprises connecting the first steering housing segment of the first module to the second steering housing segment of the second module by means of a protection tube, which is distinct from the base and inside of which the rack is intended to slide, so as to reconstitute a continuous steering housing from the first module to the second module.

6. The method according to claim 5, wherein the connecting takes place before attaching and fastening the first module and the second module, already linked to each other by the protection tube, on their respective left and right receiving areas.

7. The method according to claim 5, wherein, during the connecting, the protection tube and the first guide sleeve belonging to the first module, and/or respectively the protection tube and the second guide sleeve belonging to the second module, are joined by interlocking said protection tube and said guide sleeve into each other, in the extension of each other along the steering axis.

8. The method according to claim 5, wherein, during the connecting, at least one connection between the protection tube and one of the steering housing segments of one of the modules is performed by maintaining at least one degree of freedom between said protection tube and the module, to allow for a relative mobility of the protection tube relative to the considered module without breaking the continuity of the steering housing.

9. The method according to claim 7, wherein, during the connecting, the protection tube is interlocked with the guide sleeve of the considered module along the steering axis, to form a sliding or sliding-pivot junction along said steering axis.

10. The method according to claim 8, wherein, during the connecting, the protection tube is first secured by one of its ends to one of the modules, according to a fixed junction which holds said protection tube in a fixed position with respect to said module, prior to being engaged, by its opposite end, on the other module, according to a junction which allows a relative mobility.

11. The method according to claim 5, wherein, during the prefabrication step, the protection tube is manufactured integrally with one of the modules.

12. The method according to claim 5, wherein, as the protection tube is initially formed separately from at least one of the modules, the constituent material of said protection tube is different from the constituent material of said module.

13. The method according to claim 1, wherein the second module is made of a composite material comprising a polymer material matrix reinforced with fibers.

14. The method according to claim 1, wherein the first module is made of a light metal alloy.

15. A steering housing for accommodating and guiding in translation, along a steering axis, a steering actuating member, said steering housing being longitudinally split into
   (i) a first module which comprises, integrally in a first material, a first steering housing segment configured to form a first guide surface of the steering actuating member, and which covers a first length portion along the steering axis, and a first bearing forming a first depression arranged to accommodate and support a stabilizer bar, and
   (ii) a second module, connected to said first module, which second module comprises, integrally in a second material different from the first material, a second steering housing segment configured to form a second guide surface of the steering actuating member, said second steering housing segment extending by a protection tube to cover a second length portion along the steering axis which completes the length portion covered by the first steering housing segment, and a second bearing forming a second depression arranged to accommodate and support the stabilizer bar at a distance from the first bearing.

16. The steering housing of claim 15 wherein the actuating member is a rack.

17. The method of claim 4 wherein the guide sleeve and the access sleeve are formed integrally with each other.

18. The method of claim 8, comprising joining the protection tube and the first steering housing segment of the first module by maintaining at least one degree of freedom between said protection tube and the steering housing element, to allow for a relative mobility of the protection tube relative to the considered module without breaking the continuity of the steering housing.

19. The method of claim 8, comprising maintaining one degree of freedom in translation along the steering axis and/or one degree of freedom in rotation about said steering axis.

20. The method of claim 10, wherein the protection tube is first secured by one of its ends to the second module.

21. The method of claim 10 wherein the protection tube is engaged, by its opposite end, on the first module.

22. The method of claim 11 wherein the protection tube is manufactured integrally with the second module.

23. The method of claim 12 wherein the protection tube is formed separately from the first module.

24. The method of claim 12 wherein the constituent material of the protection tube is less dense than the constituent material of said module.

25. The method of claim 14 wherein the first module is made of an aluminum alloy or a magnesium alloy.

* * * * *